United States Patent [19]

Manowitz et al.

[11] 3,871,860
[45] Mar. 18, 1975

[54] PRESERVATIVES FOR AQUEOUS SYSTEMS

[75] Inventors: Milton Manowitz, Fair Lawn, N.J.;
Goerge R. Walter, Racine, Wis.;
Stephen Foris, Jr., Belleville, N.J.

[73] Assignee: Givaudan Corporation, Clifton, N.J.

[22] Filed: Aug. 4, 1971

[21] Appl. No.: 169,043

Related U.S. Application Data

[63] Continuation-in-part of Ser. Nos. 573,845, Aug. 22, 1966, abandoned, and Ser. No. 786,453, Dec. 23, 1968, Pat. No. 3,629,465.

[52] U.S. Cl. .................. 71/67, 424/349, 210/62, 210/64, 162/190, 21/58
[51] Int. Cl. ......... A01n 9/00, C02b 3/06, D21f 1/66
[58] Field of Search .......... 21/58; 162/190; 210/62, 210/64; 71/67; 424/349

[56] References Cited
UNITED STATES PATENTS
3,629,465  12/1971  Manowitz et al. .................. 424/349

FOREIGN PATENTS OR APPLICATIONS
22,732/64  10/1964  Japan
832,656   1/1952  Germany

*Primary Examiner*—Shep K. Rose
*Attorney, Agent, or Firm*—Thomas Cifelli, Jr.

[57] ABSTRACT

$\beta$-Bromo-$\beta$-nitrostyrene is a preservative for aqueous systems normally subject to spoilage by slime-forming algae, bacteria and fungi microorganisms.

3 Claims, No Drawings

PRESERVATIVES FOR AQUEOUS SYSTEMS

CROSS-REFERENCE TO RELATED U.S. PATENT APPLICATIONS

The present application is a continuation-in-part application of our application, Ser. No. 573,845, filed Aug. 22, 1966, now abandoned, and of our co-pending application, Ser. No. 786,453, filed Dec. 23, 1968 now U.S. Pat. No. 3,629,465, dated Dec. 27, 1971.

BACKGROUND OF THE INVENTION

The present invention relates to processes and compositions for preserving aqueous systems against the deleterious action of bacteria, fungi and algae.

It is well known that various aqueous systems containing metabolizable components, either in trace or major quantities, are normally susceptible to attack and degradation by microorganisms. Examples of such compositions are industrial cooling water and water used in pulp and paper manufacture, (so-called "process" water, e.g., "white water").

Many useful preservatives have been proposed for compositions subject to attack as indicated, but known preservatives often have failed to provide satisfactory protection or suffer from other disadvantages such as stability, toxicity, etc. For example, many preservatives, such as phenols and quaternary ammonium compounds, are inactivated by the presence of nonionic surfactants in specific formulations. Others are trapped in the oil phase of oil and water formulations and fail to inhibit microbial growth. A major deficiency of many antimicrobial compounds is their low activity against principal spoilage organisms, particularly *Pseudomonas aeruginosa* and *Escherichia coli*.

SUMMARY OF THE INVENTION

We have now found, surprisingly, that the unusual requirements for preservatives are satisfied by $\beta$-bromo-$\beta$ nitrostyrene. Even more surprisingly, it has been found that the effectiveness of this compound in question is many times that of known preservatives. In other words, much smaller amounts of the compound of the present invention as compared with known preservatives, are used to obtain equivalent preservative effects.

DESCRIPTION OF THE PREFERRED EMBODIMENTS

It has been found that the active compound of this invention is effective, in general, against a broad spectrum of microorganisms which attack the water-containing compositions and systems described herein. Examples of some of these microorganisms are:

Gram Positive Bacteria
  *Staphylococcus aureus*
  *Staphylococcus epidermidis*
  *Streptococcus faecalis*
  *Streptococcus agalactiae*
Gram Negative Bacteria
  *Escherichia coli*
  *Pseudomonas aeruginosa*
  *Proteus vulgaris*
  *Aerobacter aerogenes*
  *Salmonella typhosa*
Yeasts
  *Candida albicans*
  *Saccharomyces cerevisiae*
Molds
  *Penicillium piscarium*
  *Penicillium funiculosum*
  *Aspergillus niger*
  *Aspergillus flavus*
  *Trichophyton mentagrophytes*
Algae
  *Chlorella vulgaris*
  *Chlamydomonas pseudagloe*
  *Scenedesmus naegelii*

Minor amounts of the preservative of this invention are sufficient to prevent spoilage of various compositions caused by bacteria, algae and higher fungi. Quantites as low as 0.00005% to 0.05% by weight of the total composition have given satisfactory results. The use of greater quantities, while feasible, is recommended only in compositions of very unusual properties. The preservative is active both in acid and basic media and in the presence of substantial amounts of nonionic surfactants.

This invention may be practiced by adding the preservative to the compositions in any suitable manner. For example, the incorporation can be effected either during the preparation of the composition or after the composition has been prepared. The preservative may be added directly to the products or as a solution in a suitable solvent such as acetone, alcohol, benzene, carbon tetrachloride, etc.

EXAMPLE 1

Microbial growth in pulp and paper manufacturing or papermill water systems presents a major problem to that industry. The applicaiton of effective antimicrobials to these systems, often called white water systems, is necessary to avoid the problems and economic losses due to the microorganisms. Papermill water systems normally contain up to 15% of cellulosic fiber material and present favorable conditions for microbial growth. A detailed description of these systems is presented in U.S. Pat. No. 3,397,144.

To demonstrate the activity of the active compound in a simulated white water system, a slimicide test suggested in "microbiology of Pulp and Paper, TAPPI Monograph Series, No. 15," was used. The compounds tested were dissolved in dimethylformamide and constant volumes of suitable dilution levels were added to flasks containing 24 ml. of the following substrates:

8.4 g. Whatman No. 2 powdered cellulose
2.6 g. Sodium nitrate
1.0 g. Calcium sulfate
6.5 g. Maltose
1.0 g. Nutrient Broth, Difco
10.0 ml. 2% Mersize RM 70R (Monsanto)
2.5 ml. 2% Alum
990 ml. distilled water Using pure culture technique, the flasks were inoculated with 1 drop of an 18–24 hour Nutrient Broth culture of bacteria and an aqueous conidia suspension of fungi grown on Potato Dextrose Agar. The flasks were agitated continuously on a gyratory shaker at 28°C. and reinoculated after 7 days. The presence of bacterial growth was determined after a 2 week incubation by streaking onto Dextrose Tryptone Extract Agar plates. Fungal growth was detected visually after 14 day incubation. Control flasks included in these tests showed heavy growth of the organisms during this incubation period. The results listed below are the minimum concentrations of the compound of this invention and of 2-bromo-2-nitroethylbenzene that completely inhibited growth after 14 days.

| Organism | β-Bromo-β Nitrostyrene | 2-Bromo-2-nitroethylbenzene |
| --- | --- | --- |
| Pseudomonas aeruginosa | 15.6 | 500 |
| Aerobacter aerogenes | 31.3 | 250 |
| Aspergillus niger | 15.6 | 15.6 |
| Penicillium piscarium | 15.6 | 15.6 |

These results show that 2-bromo-2-nitroethylbenzene, although effective against the molds involved in paper mill fouling are, nevertheless, not useful in preventing slime as the compound, unlike β-bromo-β-nitrostyrene is ineffective in inhibiting the bacteria involved in such fouling.

EXAMPLE 2

Cooling towers are widely used in industry for cooling and recirculating large quantities of water used in heat exchange operations. The problems of microbial growth in these systems causing slime formations which markedly impair the efficiency is well known and is described in Betz Handbook of Industrial Water Conditioning, Betz Laboratories, Inc., Philadelphia, Pa.

The compound of our invention effectively inhibits the growth of microorganisms in cooling tower water as shown by the following tests. A sample of cooling tower water was taken from an installation which had been in operation in a chemical plant wherein a variety of organic chemicals was manufactured for several years. The installation consisted of a two cell induced draft double flow toner and accessory equipment designed to cool 2,400 gallons per minute from 95°F to 85°F. It was composed of redwood structural members with plastic fill and had a capacity of about 10,000 gallons. The water sample was inoculated with cultures of *Pseudomonas aeruginosa* and *Aerobacter aerogenes*, initial bacterial counts were taken, and the samples were divided into several aliquots. Various concentrations (from 5–50 mcg/ml) of the two compounds tested in Example 1 were added to the aliquots as alcoholic solutions and the samples were incubated on a rotary shaker at 27°C. After a 24-hour period, the bacterial counts were again measured with the following results:

| Compound | Concentration (mcg/ml) | Bacterial Counts (per ml) O hours | 24 hours |
| --- | --- | --- | --- |
| β-bromo-β nitrostyrene | 5.0 | $30 \times 10^5$ | 650 |
| " | 10.0 | $52 \times 10^5$ | 4,400 |
| 2-Bromo-2-nitroethylbenzene | 10.0 | $55 \times 10^5$ | $53 \times 10^6$ |
| " | 20.0 | $50 \times 10^5$ | $28 \times 10^6$ |
| " | 50.0 | $59 \times 10^5$ | $21 \times 10^4$ |

These data show the effectiveness of β-bromo-β nitrostyrene as a preservative for industrial cooling water and the ineffectiveness of 2-bromo-2-nitroethylbenzene for the same purpose.

It is understood that the term "aqueous" as used herein to denote compositions which can be preserved in accordance with the present invention is used in a broad sense and is not limited to solutions but also includes suspensions, emulsions and all compositions which contain water in amounts sufficient to render the compositions susceptible to degradative attack by microorganisms.

What is claimed is:

1. The process for combating spoilage by the action of slime-forming algae, bacteria and fungi microorganisms in industrial cooling water and water used in pulp and paper manufacturing, which comprises inhibiting said slime-forming organisms in such waters with an effective inhibiting amount of β-bromo-β-nitrostyrene, said amount being less than the minimal effective inhibiting concentration required for 2-bromo-2-nitroethylbenzene.

2. The process as set forth in claim 1, wherein industrial cooling water is the water.

3. The process as set forth in claim 1, wherein water used in pulp and paper manufacture is the water.

* * * * *